(12) United States Patent
Zheng et al.

(10) Patent No.: US 11,333,502 B2
(45) Date of Patent: *May 17, 2022

(54) MAP-MATCHING FOR LOW-SAMPLING-RATE GPS TRAJECTORIES

(71) Applicant: Microsoft Technology Licensing, LLC, Redmond, WA (US)

(72) Inventors: Yu Zheng, Beijing (CN); Yin Lou, Shanghai (CN); Chengyang Zhang, Beijing (CN); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

This patent is subject to a terminal disclaimer.

(21) Appl. No.: 16/406,529

(22) Filed: May 8, 2019

(65) Prior Publication Data
US 2019/0265047 A1    Aug. 29, 2019

Related U.S. Application Data

(63) Continuation of application No. 12/712,857, filed on Feb. 25, 2010, now Pat. No. 10,288,433.

(51) Int. Cl.
*G01C 21/30* (2006.01)

(52) U.S. Cl.
CPC .................... *G01C 21/30* (2013.01)

(58) Field of Classification Search
CPC ..................................... G01C 21/30
See application file for complete search history.

(56) References Cited

U.S. PATENT DOCUMENTS

| | | | | |
|---|---|---|---|---|
| 5,428,546 A | * | 6/1995 | Shah | G08G 1/127 340/990 |
| 5,802,492 A | * | 9/1998 | DeLorme | G01C 21/3476 340/990 |
| 5,845,227 A | * | 12/1998 | Peterson | G01C 21/3492 701/420 |
| 5,904,727 A | * | 5/1999 | Prabhakaran | G08G 1/127 701/454 |
| 6,023,241 A | * | 2/2000 | Clapper | G01S 19/14 342/357.32 |
| 6,091,359 A | * | 7/2000 | Geier | G01C 21/20 342/357.31 |
| 6,091,956 A | * | 7/2000 | Hollenberg | H04W 4/029 455/456.5 |
| 6,122,628 A | * | 9/2000 | Castelli | G06K 9/6222 |
| 6,128,279 A | * | 10/2000 | O'Neil | H04L 67/1008 370/229 |
| 6,219,662 B1 | * | 4/2001 | Fuh | G06F 16/24553 |
| 6,243,647 B1 | * | 6/2001 | Berstis | G01S 5/0072 701/482 |
| 6,317,684 B1 | * | 11/2001 | Roeseler | G01C 21/3415 340/990 |
| 6,317,686 B1 | * | 11/2001 | Ran | G01C 21/3691 701/117 |
| 6,351,775 B1 | * | 2/2002 | Yu | H04L 67/1014 709/238 |

(Continued)

*Primary Examiner* — Frederick M Brushaber

(57) ABSTRACT

This disclosure describes a map-matching module that supports a Global Positioning System (GPS) and provides a user with a best match trajectory corresponding to GPS sampling points taken at a low sampling rate. The best match trajectory is based upon a spatial-temporal analysis.

20 Claims, 11 Drawing Sheets

(56) References Cited

U.S. PATENT DOCUMENTS

| | | | | |
|---|---|---|---|---|
| 6,356,838 B1* | 3/2002 | Paul | G01C 21/3453 | 701/410 |
| 6,385,539 B1* | 5/2002 | Wilson | G01C 21/30 | 701/468 |
| 6,411,897 B1* | 6/2002 | Gaspard, II | G01C 21/343 | 340/991 |
| 6,424,370 B1* | 7/2002 | Courtney | G06K 9/00342 | 348/143 |
| 6,427,122 B1* | 7/2002 | Lin | G01C 21/165 | 342/26 B |
| 6,430,547 B1* | 8/2002 | Busche | G06F 16/2465 | 707/776 |
| 6,446,121 B1* | 9/2002 | Shah | H04L 41/5009 | 709/203 |
| 6,493,650 B1* | 12/2002 | Rodgers | G01C 15/00 | 340/438 |
| 6,496,814 B1* | 12/2002 | Busche | G06Q 10/10 | 706/21 |
| 6,513,026 B1* | 1/2003 | Horvitz | G06Q 10/107 | 706/46 |
| 6,516,272 B2* | 2/2003 | Lin | G01C 21/165 | 342/357.31 |
| 6,553,310 B1* | 4/2003 | Lopke | H04L 67/16 | 701/454 |
| 6,584,401 B2* | 6/2003 | Kirshenbaum | G01C 21/26 | 340/905 |
| 6,606,643 B1* | 8/2003 | Emens | H04L 29/06 | 709/200 |
| 6,611,881 B1* | 8/2003 | Gottfurcht | G16H 20/60 | 710/18 |
| 6,618,507 B1* | 9/2003 | Divakaran | G06F 16/786 | 382/236 |
| 6,625,319 B1* | 9/2003 | Krishnamachari | H04N 19/60 | 382/238 |
| 6,724,733 B1* | 4/2004 | Schuba | H04L 29/12009 | 370/252 |
| 6,732,120 B1* | 5/2004 | Du | G01C 21/20 | 715/764 |
| 6,785,704 B1* | 8/2004 | McCanne | H04L 29/12047 | 718/105 |
| 6,816,779 B2* | 11/2004 | Chen | G06T 17/05 | 340/445 |
| RE38,724 E * | 4/2005 | Peterson | G01C 21/3461 | 340/905 |
| 6,919,842 B2* | 7/2005 | Cho | G01S 19/48 | 342/357.31 |
| 6,925,447 B2* | 8/2005 | McMenimen | A61N 1/37211 | 705/28 |
| 6,965,827 B1* | 11/2005 | Wolfson | G01C 21/3415 | 340/992 |
| 6,970,884 B2* | 11/2005 | Aggarwal | G06F 16/2465 | 707/776 |
| 6,981,055 B1* | 12/2005 | Ahuja | H04L 45/04 | 370/401 |
| 7,003,555 B1* | 2/2006 | Jungck | H04L 29/12066 | 370/389 |
| 7,013,290 B2* | 3/2006 | Ananian | G06Q 30/02 | 705/26.42 |
| 7,013,517 B2* | 3/2006 | Kropf | D06F 13/08 | 68/133 |
| 7,031,517 B1* | 4/2006 | Le | G06K 9/342 | 375/E7.13 |
| 7,062,562 B1* | 6/2006 | Baker | H04L 29/12066 | 709/203 |
| 7,111,061 B2* | 9/2006 | Leighton | H04L 29/12009 | 709/224 |
| 7,136,932 B1* | 11/2006 | Schneider | H04L 29/12594 | 709/245 |
| 7,152,118 B2* | 12/2006 | Anderson, IV | H04L 29/12216 | 709/245 |
| 7,171,415 B2* | 1/2007 | Kan | G06F 16/9535 | |
| 7,194,552 B1* | 3/2007 | Schneider | H04L 29/12594 | 709/217 |
| 7,197,500 B1* | 3/2007 | Israni | G01C 21/32 | 340/995.14 |
| 7,203,693 B2* | 4/2007 | Carlbom | G06F 16/786 | |
| 7,219,067 B1* | 5/2007 | McMullen | B61L 27/0011 | 705/4 |
| 7,228,359 B1* | 6/2007 | Monteiro | H04L 29/12066 | 709/228 |
| 7,233,861 B2* | 6/2007 | Van Buer | G01C 21/3617 | 340/994 |
| 7,239,962 B2* | 7/2007 | Plutowski | G01C 21/3415 | 340/995.11 |
| 7,281,199 B1* | 10/2007 | Nicol | G06F 40/103 | 715/203 |
| 7,284,051 B1* | 10/2007 | Okano | H04L 67/1008 | 709/224 |
| 7,349,768 B2* | 3/2008 | Bruce | G01C 21/005 | 701/1 |
| 7,366,726 B2* | 4/2008 | Bellamy | G06F 16/90344 | |
| 7,389,283 B2* | 6/2008 | Adler | G06F 16/283 | 707/999.004 |
| 7,395,250 B1* | 7/2008 | Aggarwal | G06K 9/6284 | 706/20 |
| 7,428,551 B2* | 9/2008 | Luo | G06F 16/2264 | |
| 7,437,239 B2* | 10/2008 | Serre | G01C 21/3446 | 701/533 |
| 7,437,372 B2* | 10/2008 | Chen | G06F 16/2264 | |
| 7,447,588 B1* | 11/2008 | Xu | G08G 1/0104 | 340/988 |
| 7,479,897 B2* | 1/2009 | Gertsch | B60T 8/246 | 340/936 |
| 7,493,294 B2* | 2/2009 | Flinn | G06N 3/126 | 706/12 |
| 7,519,690 B1* | 4/2009 | Barrow | H04L 41/082 | 709/220 |
| 7,548,936 B2* | 6/2009 | Liu | G06F 16/954 | |
| 7,561,959 B2* | 7/2009 | Hopkins | G01C 21/26 | 701/533 |
| 7,574,508 B1* | 8/2009 | Kommula | H04L 61/1511 | 709/226 |
| 7,584,159 B1* | 9/2009 | Chakrabarti | G06Q 30/02 | 706/45 |
| 7,584,301 B1* | 9/2009 | Joshi | H04L 67/1002 | 709/244 |
| 7,603,233 B2* | 10/2009 | Tashiro | G01C 21/30 | 342/357.31 |
| 7,610,151 B2* | 10/2009 | Letchner | G01C 21/3484 | 701/424 |
| 7,660,441 B2* | 2/2010 | Chen | G06K 9/0063 | 382/113 |
| 7,685,422 B2* | 3/2010 | Isozaki | H04L 63/061 | 713/171 |
| 7,739,040 B2* | 6/2010 | Horvitz | G01C 21/3492 | 701/414 |
| 7,801,842 B2* | 9/2010 | Dalton | G09B 29/007 | 706/58 |
| 7,840,407 B2* | 11/2010 | Strope | G06F 16/29 | 704/257 |
| 7,904,530 B2* | 3/2011 | Partridge | G06F 16/9535 | 709/217 |
| 7,920,965 B1* | 4/2011 | Nesbitt | G01C 21/00 | 701/416 |
| 7,930,427 B2* | 4/2011 | Josefsberg | H04L 67/1002 | 709/245 |
| 7,948,400 B2* | 5/2011 | Horvitz | G08G 1/0104 | 340/934 |
| 7,982,635 B2* | 7/2011 | Seong | G01C 21/36 | 340/995.1 |
| 7,984,006 B2* | 7/2011 | Price | G06Q 30/02 | 706/46 |
| 8,060,462 B2* | 11/2011 | Flinn | G06Q 50/01 | 707/603 |
| 8,117,138 B2* | 2/2012 | Apte | G06N 20/00 | 706/12 |

(56) References Cited

U.S. PATENT DOCUMENTS

| | | | |
|---|---|---|---|
| 8,190,649 B2* | 5/2012 | Bailly | G06F 16/2246 707/797 |
| 8,219,112 B1* | 7/2012 | Youssef | H04W 64/003 455/456.1 |
| 8,275,649 B2* | 9/2012 | Zheng | G06Q 30/02 705/7.34 |
| 8,458,298 B2* | 6/2013 | Josefsberg | H04L 41/0668 709/220 |
| 8,562,439 B2* | 10/2013 | Shuman | A63F 13/65 463/42 |
| 8,577,380 B2* | 11/2013 | Frias Martinez | G06T 17/20 455/446 |
| 9,009,177 B2* | 4/2015 | Zheng | G06F 16/282 707/758 |
| 10,288,433 B2* | 5/2019 | Zheng | G01C 21/30 |
| 10,621,228 B2* | 4/2020 | Desmond | G06F 16/51 |
| 10,982,961 B2* | 4/2021 | Sumizawa | B60W 30/10 |
| 2001/0029425 A1* | 10/2001 | Myr | G08G 1/096816 701/117 |
| 2002/0032689 A1* | 3/2002 | Abbott, III | G06F 16/907 |
| 2002/0038360 A1* | 3/2002 | Andrews | H04L 67/101 709/223 |
| 2002/0044690 A1* | 4/2002 | Burgess | G06F 16/29 382/209 |
| 2002/0052873 A1* | 5/2002 | Delgado | G06Q 30/02 |
| 2002/0062193 A1* | 5/2002 | Lin | G01S 19/49 701/472 |
| 2002/0077749 A1* | 6/2002 | Doi | G01C 21/20 701/433 |
| 2002/0128768 A1* | 9/2002 | Nakano | G01C 21/32 701/533 |
| 2003/0053424 A1* | 3/2003 | Krishnamurthy | H04W 24/02 370/316 |
| 2003/0063133 A1* | 4/2003 | Foote | G06F 16/29 715/850 |
| 2003/0069893 A1* | 4/2003 | Kanai | G06F 16/58 |
| 2003/0069968 A1* | 4/2003 | O'Neil | H04L 67/1014 709/225 |
| 2003/0139898 A1* | 7/2003 | Miller | G04R 20/12 702/178 |
| 2003/0140040 A1* | 7/2003 | Schiller | G06Q 30/02 |
| 2003/0195810 A1* | 10/2003 | Raghupathy | G06Q 30/0283 705/20 |
| 2003/0212689 A1* | 11/2003 | Chen | G06F 16/2264 |
| 2003/0217070 A1* | 11/2003 | Gotoh | G01S 5/0018 |
| 2003/0229697 A1* | 12/2003 | Borella | H04L 63/08 709/226 |
| 2004/0039798 A1* | 2/2004 | Hotz | H04L 61/1511 709/219 |
| 2004/0064338 A1* | 4/2004 | Shiota | H04N 1/00137 705/1.1 |
| 2004/0073640 A1* | 4/2004 | Martin | H04L 67/1002 709/223 |
| 2004/0117358 A1* | 6/2004 | von Kaenel | G06Q 40/08 |
| 2004/0196161 A1* | 10/2004 | Bell | G08G 1/0104 340/905 |
| 2004/0198386 A1* | 10/2004 | Dupray | H04W 64/00 455/456.1 |
| 2004/0217884 A1* | 11/2004 | Samadani | G01C 21/20 340/995.14 |
| 2004/0220965 A1* | 11/2004 | Harville | G06F 16/58 |
| 2004/0264465 A1* | 12/2004 | Dunk | H04L 63/0442 370/392 |
| 2005/0004830 A1* | 1/2005 | Rozell | G06Q 30/02 705/7.34 |
| 2005/0004903 A1* | 1/2005 | Tsuda | G06F 16/9537 |
| 2005/0031296 A1* | 2/2005 | Grosvenor | G06F 16/784 386/282 |
| 2005/0075116 A1* | 4/2005 | Laird | A61B 5/411 455/456.3 |
| 2005/0075119 A1* | 4/2005 | Sheha | G01C 21/3626 455/456.6 |
| 2005/0075782 A1* | 4/2005 | Torgunrud | G08G 1/096811 701/117 |
| 2005/0075784 A1* | 4/2005 | Gray | G01C 21/00 701/25 |
| 2005/0080554 A1* | 4/2005 | Ono | G01C 21/3644 701/533 |
| 2005/0108261 A1* | 5/2005 | Glassy | G06F 16/29 |
| 2005/0131889 A1* | 6/2005 | Bennett | G06F 16/2428 |
| 2005/0198286 A1* | 9/2005 | Xu | H04L 45/02 709/225 |
| 2005/0203927 A1* | 9/2005 | Sull | G06F 16/71 |
| 2005/0225678 A1* | 10/2005 | Zisserman | G06F 16/5838 348/571 |
| 2005/0231394 A1* | 10/2005 | Machii | G08G 1/09675 340/995.13 |
| 2005/0265317 A1* | 12/2005 | Reeves | H04L 67/1019 370/235 |
| 2005/0278371 A1* | 12/2005 | Funk | G06F 16/29 |
| 2006/0020597 A1* | 1/2006 | Keating | G06F 16/5838 |
| 2006/0036630 A1* | 2/2006 | Gray | G06F 16/29 |
| 2006/0042483 A1* | 3/2006 | Work | G06F 16/24578 101/91 |
| 2006/0085177 A1* | 4/2006 | Toyama | G01C 21/26 703/22 |
| 2006/0085419 A1* | 4/2006 | Rosen | G06F 16/9537 |
| 2006/0090122 A1* | 4/2006 | Pyhalammi | H04L 67/04 715/202 |
| 2006/0095540 A1* | 5/2006 | Anderson | H04W 4/029 709/217 |
| 2006/0101377 A1* | 5/2006 | Toyama | G06Q 30/02 717/104 |
| 2006/0129675 A1* | 6/2006 | Zimmer | G06F 1/3209 709/225 |
| 2006/0143442 A1* | 6/2006 | Smith | H04L 63/166 713/156 |
| 2006/0149464 A1* | 7/2006 | Chien | G01C 21/3492 701/533 |
| 2006/0155464 A1* | 7/2006 | Smartt | G01C 21/3819 701/450 |
| 2006/0156209 A1* | 7/2006 | Matsuura | H04M 1/72472 714/798 |
| 2006/0161560 A1* | 7/2006 | Khandelwal | G06F 16/334 |
| 2006/0164238 A1* | 7/2006 | Karaoguz | H04W 4/029 340/539.13 |
| 2006/0173838 A1* | 8/2006 | Garg | G06Q 30/02 |
| 2006/0178807 A1* | 8/2006 | Kato | G08G 1/096894 701/117 |
| 2006/0190602 A1* | 8/2006 | Canali | H04L 67/1029 709/226 |
| 2006/0200539 A1* | 9/2006 | Kappler | H04L 61/2015 709/220 |
| 2006/0212217 A1* | 9/2006 | Sheha | G01C 21/005 701/412 |
| 2006/0224303 A1* | 10/2006 | Hayashi | G01C 21/3667 701/431 |
| 2006/0224773 A1* | 10/2006 | Degenaro | G06F 9/5083 709/240 |
| 2006/0247844 A1* | 11/2006 | Wang | G08G 1/01 701/117 |
| 2006/0251292 A1* | 11/2006 | Gokturk | G06F 16/58 382/103 |
| 2006/0265125 A1* | 11/2006 | Glaza | G08G 1/096822 701/417 |
| 2006/0266830 A1* | 11/2006 | Horozov | G07C 13/00 235/386 |
| 2007/0005419 A1* | 1/2007 | Horvitz | G06Q 30/02 701/533 |
| 2007/0006098 A1* | 1/2007 | Krumm | H04W 4/18 715/825 |
| 2007/0016663 A1* | 1/2007 | Weis | G06F 11/2041 709/223 |
| 2007/0038362 A1* | 2/2007 | Gueziec | G08G 1/096816 701/117 |
| 2007/0041393 A1* | 2/2007 | Westhead | H04L 29/12066 370/428 |

(56) References Cited

U.S. PATENT DOCUMENTS

| | | | |
|---|---|---|---|
| 2007/0064633 A1* | 3/2007 | Fricke | H04L 67/04 370/310 |
| 2007/0064715 A1* | 3/2007 | Lloyd | H04L 43/0864 370/401 |
| 2007/0088974 A1* | 4/2007 | Chandwani | G06F 11/0724 714/6.11 |
| 2007/0100776 A1* | 5/2007 | Shah | G06Q 30/0283 705/400 |
| 2007/0118668 A1* | 5/2007 | McCarthy | H04L 67/1019 709/238 |
| 2007/0127833 A1* | 6/2007 | Singh | G06F 16/583 382/254 |
| 2007/0168208 A1* | 7/2007 | Aikas | G06Q 30/02 701/532 |
| 2007/0203638 A1* | 8/2007 | Tooyama | G08G 1/0969 701/457 |
| 2007/0226004 A1* | 9/2007 | Harrison | G06Q 30/02 705/26.1 |
| 2008/0004789 A1* | 1/2008 | Horvitz | G01C 21/3492 701/117 |
| 2008/0004793 A1* | 1/2008 | Horvitz | G08G 1/01 701/487 |
| 2008/0016051 A1* | 1/2008 | Schiller | G06F 16/29 |
| 2008/0016233 A1* | 1/2008 | Schneider | G06F 16/951 709/230 |
| 2008/0052303 A1* | 2/2008 | Adler | G06F 16/2246 |
| 2008/0059576 A1* | 3/2008 | Liu | G06Q 50/01 709/204 |
| 2008/0071465 A1* | 3/2008 | Chapman | G01C 21/3691 701/117 |
| 2008/0076451 A1* | 3/2008 | Sheha | H04W 4/029 455/456.3 |
| 2008/0086574 A1* | 4/2008 | Raciborski | H04L 61/1511 709/245 |
| 2008/0098313 A1* | 4/2008 | Pollack | G06Q 10/10 715/753 |
| 2008/0201074 A1* | 8/2008 | Bleckman | G01C 21/30 701/431 |
| 2008/0201102 A1* | 8/2008 | Boettcher | G06K 9/6219 702/179 |
| 2008/0214157 A1* | 9/2008 | Ramer | G06F 16/68 455/414.1 |
| 2008/0215237 A1* | 9/2008 | Perry | G01C 21/3484 701/533 |
| 2008/0228396 A1* | 9/2008 | Machii | G01C 21/32 701/533 |
| 2008/0228783 A1* | 9/2008 | Moffat | G06F 16/29 |
| 2008/0235383 A1* | 9/2008 | Schneider | H04L 29/12594 709/229 |
| 2008/0268876 A1* | 10/2008 | Gelfand | H04W 4/029 455/457 |
| 2008/0270019 A1* | 10/2008 | Anderson | G06Q 10/06 701/533 |
| 2008/0312822 A1* | 12/2008 | Lucas | G01S 19/42 701/465 |
| 2008/0319648 A1* | 12/2008 | Poltorak | G08G 1/0969 701/423 |
| 2008/0319660 A1* | 12/2008 | Horvitz | G09B 29/106 701/431 |
| 2008/0319974 A1* | 12/2008 | Ma | G06F 16/29 |
| 2009/0005987 A1* | 1/2009 | Vengroff | H04W 4/024 701/300 |
| 2009/0019181 A1* | 1/2009 | Fang | H04L 61/6009 709/245 |
| 2009/0063646 A1* | 3/2009 | Mitnick | G06Q 10/10 709/206 |
| 2009/0070035 A1* | 3/2009 | Van Buer | G01C 21/32 701/450 |
| 2009/0083128 A1* | 3/2009 | Siegel | G06Q 30/02 705/7.34 |
| 2009/0083237 A1* | 3/2009 | Gelfand | G06F 16/58 |
| 2009/0100018 A1* | 4/2009 | Roberts | G06F 16/29 |
| 2009/0138188 A1* | 5/2009 | Kores | G01C 21/32 701/117 |
| 2009/0164516 A1* | 6/2009 | Svendsen | G06F 16/489 |
| 2009/0213844 A1* | 8/2009 | Hughston | H04M 3/4938 370/352 |
| 2009/0216435 A1* | 8/2009 | Zheng | H04N 21/4126 701/533 |
| 2009/0216704 A1* | 8/2009 | Zheng | G06N 20/00 706/52 |
| 2009/0222581 A1* | 9/2009 | Josefsberg | H04L 67/18 709/245 |
| 2009/0228198 A1* | 9/2009 | Goldberg | G01C 21/26 701/533 |
| 2009/0239552 A1* | 9/2009 | Churchill | G06Q 30/02 455/456.3 |
| 2009/0282122 A1* | 11/2009 | Patel | H04L 67/18 709/207 |
| 2009/0326802 A1* | 12/2009 | Johnson | G01C 21/3492 701/533 |
| 2010/0004997 A1* | 1/2010 | Mehta | H04W 4/029 705/14.66 |
| 2010/0027527 A1* | 2/2010 | Higgins | H04L 67/306 370/351 |
| 2010/0070171 A1* | 3/2010 | Barbeau | G01C 21/3617 701/408 |
| 2010/0076968 A1* | 3/2010 | Boyns | H04L 67/22 707/732 |
| 2010/0082611 A1* | 4/2010 | Athsani | G06Q 30/02 707/724 |
| 2010/0111372 A1* | 5/2010 | Zheng | G06Q 30/0205 382/113 |
| 2010/0153292 A1* | 6/2010 | Zheng | G06Q 30/0282 705/347 |
| 2010/0279616 A1* | 11/2010 | Jin | H04W 16/28 455/62 |
| 2010/0312461 A1* | 12/2010 | Haynie | B61L 25/025 701/117 |
| 2011/0022299 A1* | 1/2011 | Feng | G01C 21/20 701/533 |
| 2011/0029224 A1* | 2/2011 | Chapman | G08G 1/0104 701/118 |
| 2011/0130947 A1* | 6/2011 | Basir | G08G 1/0133 701/119 |
| 2011/0176000 A1* | 7/2011 | Budge | G06T 7/187 348/143 |
| 2011/0184949 A1* | 7/2011 | Luo | G06F 16/58 707/737 |
| 2011/0191011 A1* | 8/2011 | McBride | H04W 28/06 701/117 |
| 2011/0191284 A1* | 8/2011 | Dalton | G06N 5/02 706/58 |
| 2011/0208419 A1* | 8/2011 | Boss | G01C 21/3492 701/533 |
| 2011/0280453 A1* | 11/2011 | Chen | G06T 7/75 382/113 |
| 2012/0030064 A1* | 2/2012 | Flinn | G06Q 10/0631 705/26.7 |
| 2012/0256770 A1* | 10/2012 | Mitchell | G08G 1/127 340/989 |
| 2013/0166188 A1* | 6/2013 | Zheng | G06K 9/00624 701/117 |
| 2014/0088791 A1* | 3/2014 | Alpert | G08G 9/00 701/1 |
| 2017/0131110 A1* | 5/2017 | Zheng | G01C 21/26 |

\* cited by examiner

MAP-MATCHING FOR LOW-SAMPLING-RATE GPS TRAJECTORIES

CROSS-REFERENCE TO RELATED APPLICATIONS

This application is a continuation of U.S. application Ser. No. 12/712,857, filed Feb. 25, 2010, now U.S. Pat. No. 10,288,433, issued May 14, 2019, and titled "MAP-MATCHING FOR LOW-SAMPLING-RATE GPS TRAJECTORIES," the disclosure of which is hereby incorporated herein by reference.

BACKGROUND

There has been an increased use of handheld or dashboard-mounted travel guidance systems, for example, Global Positioning System (GPS)-embedded personal digital assistants (PDAs) and smart phones. In addition, there has been an increase in applications such as route planners, hot route finders, traffic flow analyzers, and geographical social network applications that use GPS data to achieve a better quality of service.

Typically, a GPS trajectory consists of a sequence of positions with latitude, longitude, instant speed, direction and timestamp information. However, this data can often be incorrect as a result of measurement errors caused by the limitations of typical GPS devices, as well as sampling errors caused by the sampling rate. Therefore, an observed GPS position often needs to be aligned with a road network on a digital map. This process is referred to as map-matching. The difficulty of map-matching can greatly differ depending on GPS accuracy and the sampling frequency, for example, map-matching is easier with data that is gathered frequently, and with a high degree of accuracy, than with data that is inaccurate or that is gathered less frequently.

Existing map-matching approaches generally employ an algorithm that maps sampled positions from a GPS trajectory onto vector road segments on a map. Such an approach typically considers sampled positions on a GPS trajectory while overlooking the speed and temporal data that may also be found in the GPS trajectory. These map-matching algorithms are typically most accurate when using data gathered at a high sampling rate. As sampling frequency decreases, measurement errors typically increase. However, while a high sampling rate results in increased accuracy, it also carries a greater computational cost.

Map-matching for low-sampling-rate GPS data is challenging because, as the sampling rate decreases, the interval between two neighboring positions in a trajectory increases, and less information is available to deduce the precise location of an object. A more effective approach for map-matching for low-sampling rate GPS trajectories utilizes temporal and speed data from the GPS trajectory to augment the spatial data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In view of the above, this disclosure describes an exemplary method, user-interface, and computer-readable media for implementing map-matching for low-sampling rate GPS trajectories.

In an exemplary implementation, a mapping module receives a GPS trajectory that represents a path traveled by a user. For example, as the user is driving through town, a GPS device automatically records data at regular, predetermined time intervals. The GPS trajectory includes spatial data (e.g., one or more sampling points, latitude, longitude, and direction) and temporal data (e.g., speed and timestamp). A set of one or more candidate projection points surrounding each of the one or more sampling points of the trajectory is retrieved from a road network database, and one or more candidate road segments upon which the candidate projection points lie are determined. Spatial and temporal analyses are performed on the retrieved set of one or more candidate projection points. A candidate graph is constructed based upon the results of the spatial analysis and the temporal analysis, and the candidate graph is evaluated to determine the set of candidate projection points that best matches the one or more sampling points received from the user.

Map-matching that is performed based on the GPS trajectory may also be used to calculate a recommended route based on user-submitted data that identifies additional locations to which the user would like to travel. For example, a user interface may be provided through which a user submits one or more locations to which the user would like to travel. Those points are appended to the existing GPS trajectory, and the mapping module calculates a route to the user-submitted locations based, at least in part, on the previously collected GPS trajectory. The calculated route is then presented to the user.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Map-matching for low-sampling rate global positioning system (GPS) trajectories is described. More specifically, an exemplary map-matching algorithm utilizes both a spatial analysis and a temporal analysis to analyze a submitted set of sampling points to determine a best match trajectory, or route, which is presented to the user.

Figure 1:
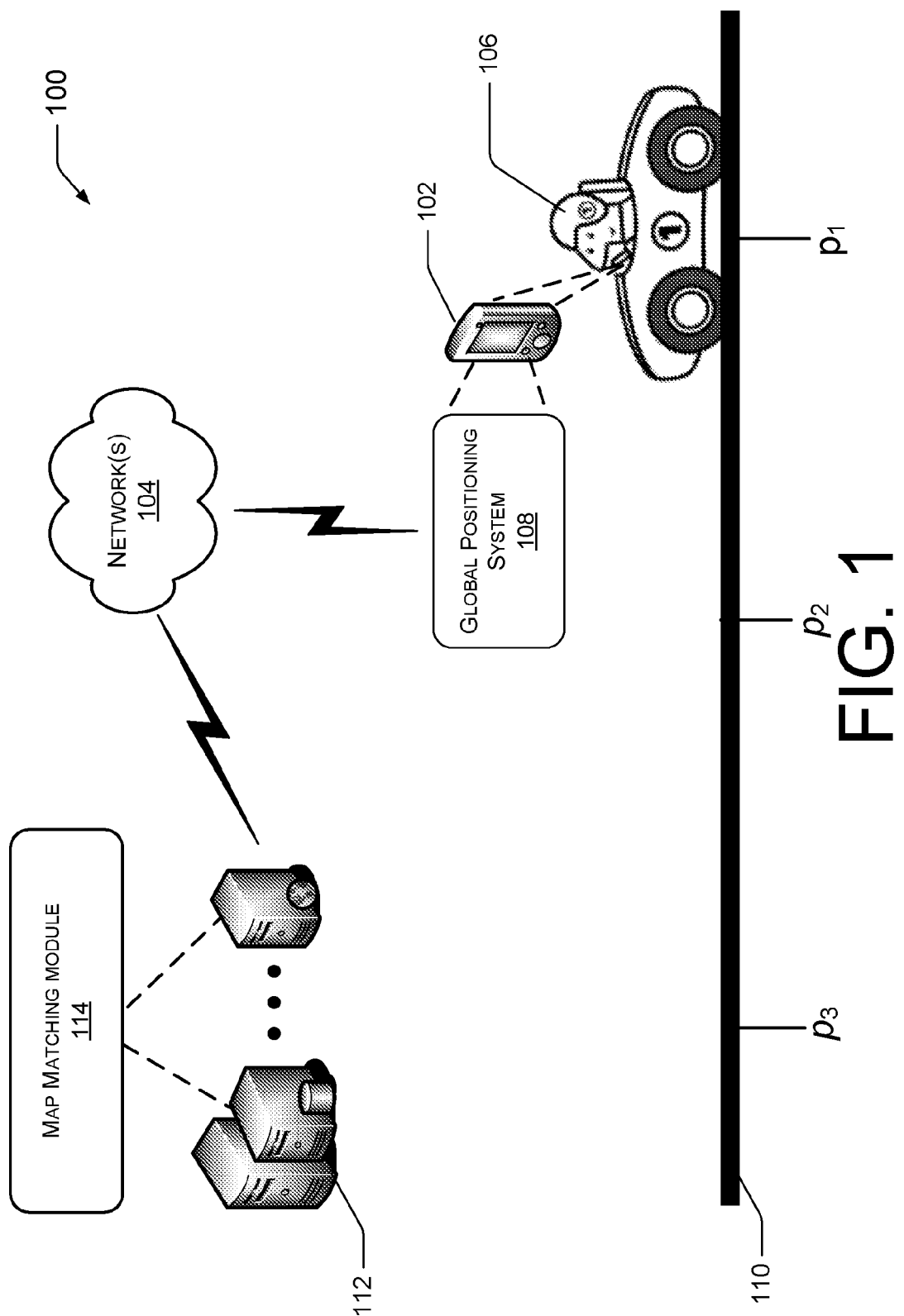
FIG. 1 is a schematic of an illustrative architecture of a map-matching framework.

FIG. 1 is a block diagram of an exemplary environment 100, which is used for map-matching for a low-sampling rate GPS on a computing device. The environment 100 includes an exemplary computing device 102, which may take a variety of forms including, but not limited to, a portable handheld computing device (e.g., a personal digital assistant, a smart phone, a cellular phone), a laptop computer, a desktop computer, a media player, a digital camcorder, an audio recorder, a camera, or any other device capable of connecting to one or more network(s) 104 to log or to record daily activities for a user 106 (i.e., creating a location history). The computing device 102, which connects to one or more network(s) 104, is often associated with a user 106. For example, the user 106 often carries their computing device 102 when travelling outside the home.

The network(s) 104 represent any type of communications network(s), including, but not limited to, wire-based networks (e.g., cable), wireless networks (e.g., cellular, satellite), cellular telecommunications network(s), and IP-based telecommunications network(s) (e.g., Voice over Internet Protocol networks). The network(s) 104 may also include traditional landline or a public switched telephone network (PSTN), or combinations of the foregoing (e.g., Unlicensed Mobile Access or UMA networks, circuit-switched telephone networks or IP-based packet-switch networks).

The computing device 102 accesses a global positioning system (GPS) that conveniently logs navigation and positioning information as the device moves with the user 106. In an exemplary implementation, a GPS 108 in the computing device 102 starts recording location data upon detecting a satellite signal. For example, a GPS receiver collects the location data, $p_1$, $p_2$, and $p_3$ along a GPS trajectory 110 based on pre-determined rate. In the exemplary implementation, the GPS 108 in the computing device 102 uses a low sampling rate to minimize computations and network bandwidth usage. For example, the GPS 108 may record data every 2 minutes, every 5 minutes, or the like. The GPS 108 continues to collect the location data as long as there is a satellite signal detected on the network 104.

The user 106 enters a starting location and a desired destination through a user interface of the computing device 102. The user-submitted starting location and desired destination, along with the data collected by the GPS 108, is sent over network 104 to servers 112. Exemplary servers 112 include a map-matching module 114 that analyzes the data collected by the GPS to determine a preferred route, for example, the shortest and most direct route from the starting location to the user-submitted desired destination. The map-matching module 114 determines the preferred route by preparing candidate projection points, performing spatial and temporal analysis, and matching the results. The determined route is then stored and/or presented visually to the user. Alternatively, the data collected by the GPS may be used to determine a route consisting entirely of highways, a route consisting entirely of service roads, or the like. The map-matching module 114 provides the result back to the user via the computing device 102 through a network service provider, a context-aware computing service, email, text message, a pop up, and the like.

Figure 2:
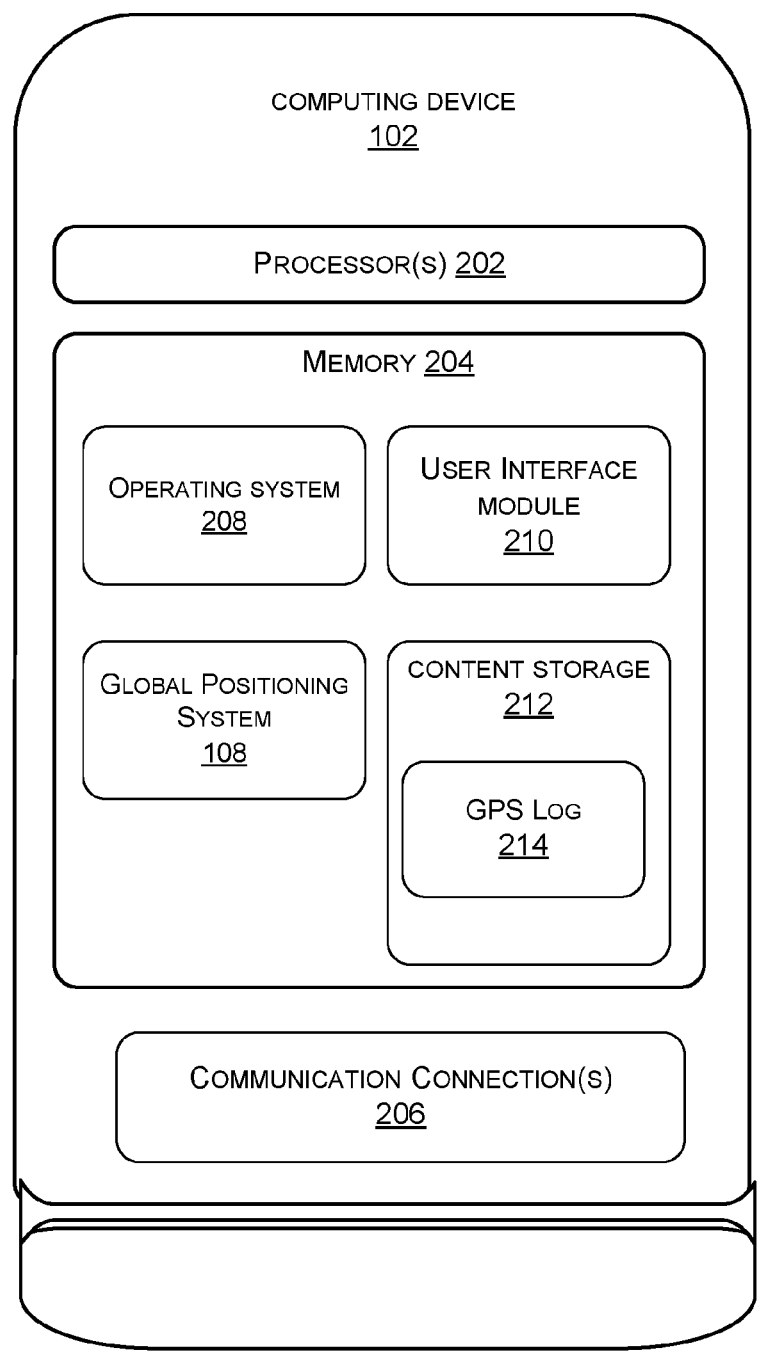
FIG. 2 is a block diagram of an exemplary computing device within the map-matching framework of FIG. 1.

FIG. 2 illustrates an exemplary computing device 102. The computing device 102 includes, without limitation, a processor 202, a memory 204, and one or more communication interfaces 206. An operating system 208, a user interface (UI) module 210, a global positioning system (GPS) 108, and content storage 212 are maintained in memory 204 and executed on processor 202.

When executed on the processor 202, the operating system 208 and UI module 210 collectively facilitate presentation of a user interface on a display of the computing device 102. GPS 108 may be implemented as a component of a web browser or a search engine, or may be implemented as an application in the computing device 102. As described above, the GPS 108 collects location data (e.g., GPS trajectories) over time as the computing device physically moves from one location to another. Content storage 212 provides local storage of sampling points and/or data received from map-matching module 114. For example, the sampling points and/or data received from the map-matching module may be stored in GPS log 214.

The communication interfaces 204 may include, without limitation, a wide area network (WAN) interface, a local area network interface (e.g., WiFi), a personal area network (e.g., Bluetooth) interface, and/or any other suitable communication interfaces to allow the computing device 102 to communicate over the network(s) 104.

The computing device 102, as described above, may be implemented in various types of system or networks. For example, the computing device may be a part of, without limitation, a client-server system, a peer-to-peer computer network, a distributed network, an enterprise architecture, a local area network, a wide area network, a virtual private network, a storage area network, and the like.

Figure 3:
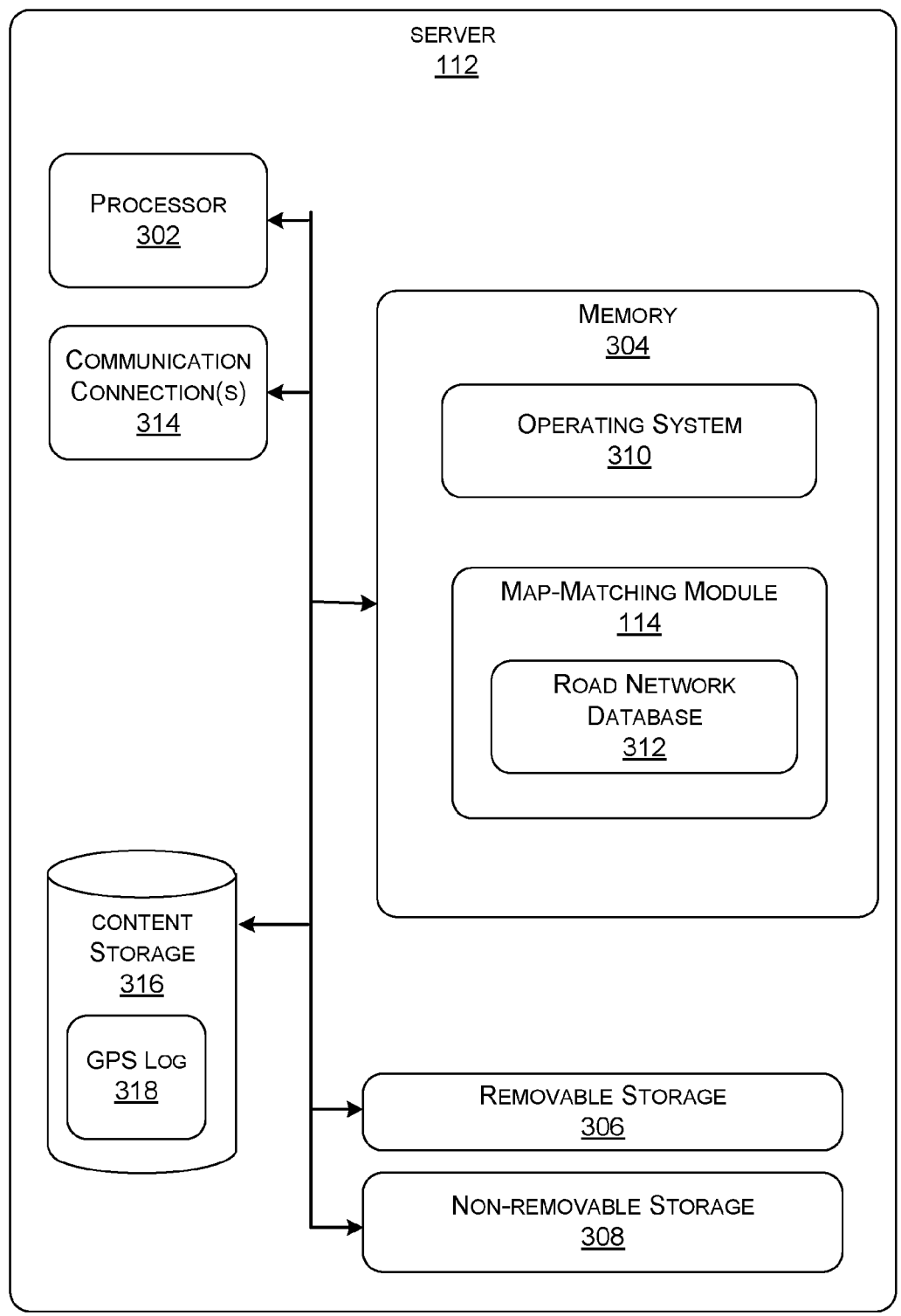
FIG. 3 is a block diagram of an exemplary server within the map-matching framework of FIG. 1.

FIG. 3 illustrates an exemplary server within the map-matching framework of FIG. 1. The illustrated exemplary server 112 includes, without limitation, processor 302, memory 304, removable storage 306 and/or non-removable storage 308, communication interface(s) 314, and content storage 316.

An operating system 310, and a map-matching module 114 are maintained in the memory 304 and executed on the processor 302. In an exemplary implementation, the map-matching module 114 includes a road network database 312 that includes, without limitation information pertaining to at least geographical locations within roadway system(s). For example, road network database 312 may contain a mapping system of the roadways of the greater Seattle area including, service roads, highways, and any other roads available to the user 106. Map-matching module 114 may also include databases of other types of information, including for example, rivers, railways, airports, restaurants, hotels, etc.

Communication interfaces 314, allow the processor 302 to communicate with the computing device 102, other network servers, network storage, and/or other devices over the network(s) 104, and content storage 316. Content storage 316 may store the GPS data collected by the GPS 108 and sent to the server 112. For example, the GPS data may be stored in GPS log 318. Although not shown in FIG. 3, the server 112 may also include one or more known input device(s), such as a keyboard, a mouse, a pen, a voice input device, a touch input device, and an output device such as a display, speaker, printer, or the like.

Any memory described herein may include volatile memory (such as RAM), nonvolatile memory, removable memory, and/or non-removable memory, implemented in any method or technology for storage of information, such as, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other storage devices, or any other medium which can be used to store the desired information and which can be accessed by the respective systems and devices.

Figure 4:
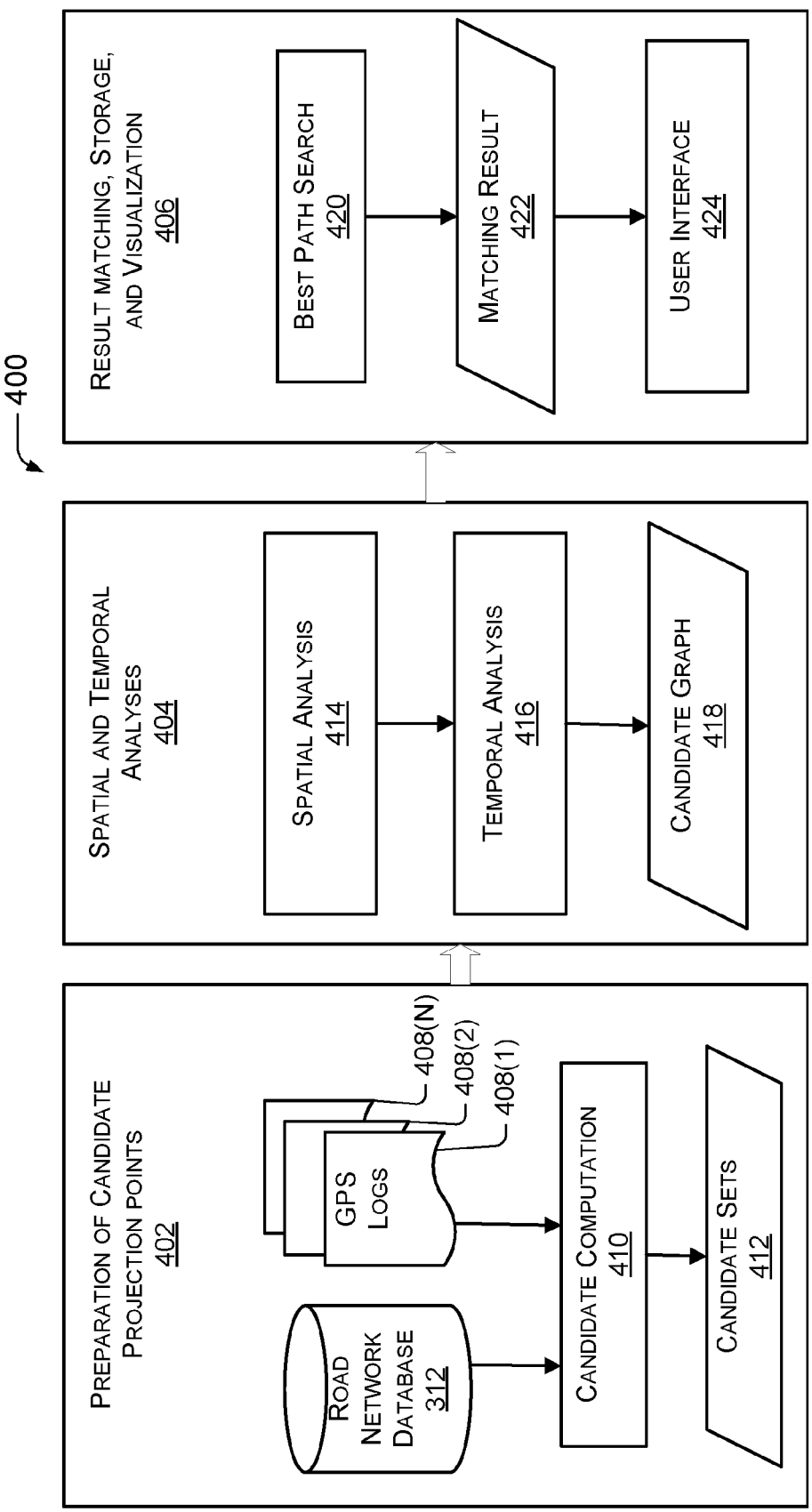
FIG. 4 is a flow chart of an exemplary map-matching process for determining a best-match trajectory.

FIG. 4 illustrates a process 400 for determining a best-match trajectory within the map-matching framework of FIG. 1. The map-matching framework of FIG. 1 enables the analysis of the data collected by the computing device to determine a preferred route from the starting location to the user desired destination.

The process 400 includes, without limitation, preparation of candidate projection points 402, spatial and temporal analyses 404, and result matching, storage, and visualization 406.

To prepare the candidate projection points, the map-matching module obtains data from GPS logs 408(1), 408(2), . . . , 408(N) and the road network database 312. A candidate computation 410 is then performed, the results of which are used to determine candidate sets 412. GPS logs 408 may correspond, for example, to GPS log 214 or GPS log 318 shown in FIG. 2 and FIG. 3, respectively.

Spatial and temporal analyses 404 are then performed. For example, a spatial analysis 414 and a temporal analysis 416 are performed on the candidate sets 412, resulting in a candidate graph 418.

The process concludes with result matching, storage, and visualization 406. For example, a best path search 420 is performed on the candidate graph 418 to determine a matching result 422. The matching result, or the preferred route, is presented to the user via a user interface 424.

Specific portions of process 400 are described below in greater detail with reference to FIG. 5-FIG. 9. However, it is to be appreciated that the description is not necessarily limited to the specific features or methods described.

Figure 5:
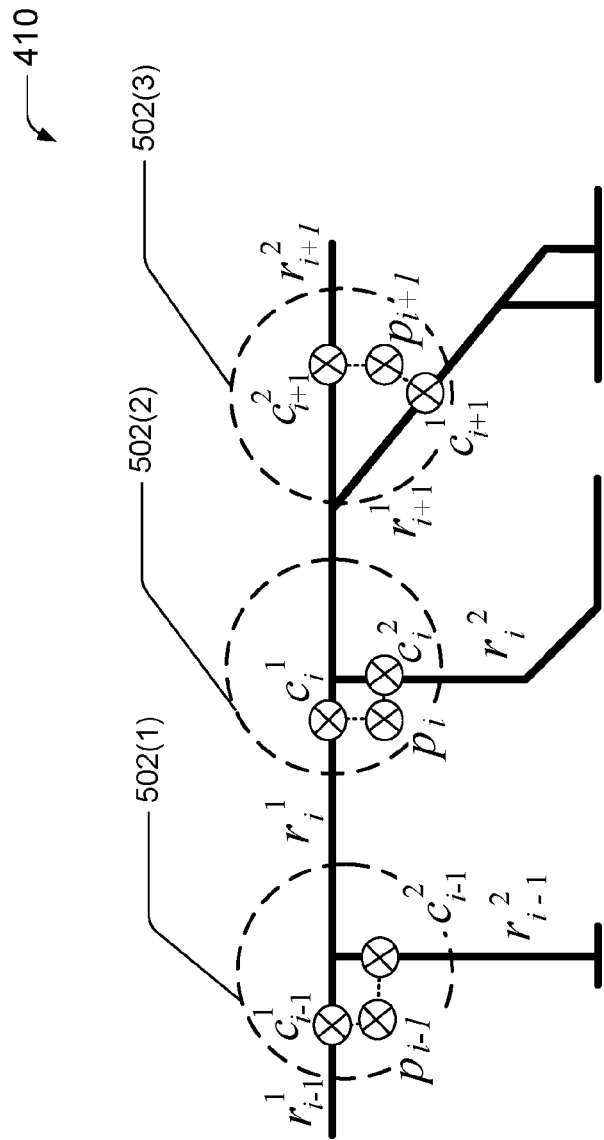
FIG. 5 is an illustration of exemplary sampling points mapped to sets of candidate projection points along mapped road segments.

FIG. 5 illustrates an exemplary candidate computation 410 portion of the process describe above with reference to FIG. 4. Referring back to FIG. 1 and FIG. 4, in an exemplary implementation, as the user 106 travels along the trajectory 110, raw GPS trajectory data, or sampling points, are automatically collected by computing device 102 and communicated to the map-matching module 114. The sampling points are taken at a low frequency, such as every 2 to 5 minutes, and are stored in GPS logs 408. As described above, GPS logs 408 may correspond to the GPS log 214 in the computing device 102 and/or the GPS log 318 in the server 112. Map-matching module 114 accesses the sampling points stored in the GPS log 408 to determine the best trajectory or route to get the user 106 from an identified starting location to a desired destination by first determining a set of candidate projection points corresponding to the sampling points stored in the GPS log 408. To determine the set of candidate projection points, map-matching module 114 utilizes a road network database 312 which, as discussed above, includes possible candidate road segments, or routes, available to the user 106. Using the information from the road network database 312 and GPS log 408, map-matching module 114 performs a candidate computation 404, an example of which is shown in FIG. 5.

Exemplary candidate computation 410 is determined by plotting one or more sampling points, $p_i$, along a determined candidate road segment. For each sampling point $p_i$, a circle 502 encompasses a set of candidate road segments supplied by road network database 312 within a given radius. In the example illustrated in FIG. 5, three sampling points are shown (i.e., $p_{i-1}$, $p_i$, and $p_{i+1}$). Focusing first on sampling point $p_{-1}$, two candidate road segments (i.e., and $r_{i-1}^1$ and $r_{i-1}^2$) lie within the circle 502(1) of $p_{i-1}$, indicating that the sampled point $p_{i-1}$ may correspond to a point on either road segment $r_{i-1}^1$ or road segment $r_{i-1}^2$. Utilizing this data, the map-matching module 114 determines at least one set of candidate projection points that lie along the candidate road segments $r_{i-1}^1$ and $r_{i-1}^2$. For example, as further shown in FIG. 5, the map-matching module 114 determines candidate projection points $c_{i-1}^1$ and $c_{i-1}^2$, corresponding to sampling point $p_{i-1}$.

Similarly, the map-matching module 114 also identifies candidate projection points $c_i^1$ and $c_i^2$ along candidate road segments $r_i^1$ and $r_i^2$ respectively, within the circle 502(2) encompassing sampling point $p_i$; and identifies candidate projection points $c_{i+1}^1$ and $c_{i+1}^1$ corresponding to sampling point $p_{i+1}$, where sampling point $p_{i+1}$ is encompassed by circle 502(3).

The result of the candidate computation 410 is, for each sampling point, a set of candidate projection points. Referring to the example shown in FIG. 5, the candidate computation 410 results in set $\{c_{i-1}^1, c_{i-1}^2\}$ corresponding to sampling point $p_{i-1}$; set $\{c_i^1, c_i^2\}$ corresponding to sampling point $p_i$; and set $\{c_{i+1}^1, c_{i+1}^2\}$ corresponding to sampling point $p_{i+1}$.

In an exemplary implementation, one or more indexing techniques may be used to expedite the generation of a set of candidate projection points. For example, indexing techniques that may be used include, without limitation, a space-partition based indexing method, such as the grid-based spatial index and the quad tree indexing structure, or a data driven indexing structure such as an R-tree indexing structure.

After determining the set of candidate projection points, as described above, the map-matching algorithm performs a spatial analysis 414 and a temporal analysis 416 to identify a particular candidate projection point within each set of candidate projection points that best matches the corresponding sampling point.

Exemplary spatial analysis 414 utilizes geometric and topological information from the road network database 312 to evaluate each of the determined candidate projection points. In one implementation, spatial analysis 414 includes two components, an observation probability component and a transmission probability component.

The observation probability component represents the likelihood that a trajectory, or route, supplied from the map-matching module 114 to the user 106 is the best route based upon the distance between two candidate points, such as candidate points $c_i^1$ and $c_i^2$. However, because no additional information is taken into account the result typically includes an error.

The error in the observation probability is calculated as a normal distribution N ($\mu$, $\sigma^2$) using the distance between sampling point $p_i$ and candidate point $c_i^j$. The normal distribution demonstrates how likely the trajectory supplied from the map-matching module 114 would have been if the user 106 had actually been on a road with a location $c_i^j$ and without considering any previous points. Accordingly, the observation probability is calculated according to:

$$N(c_i^j) = \frac{1}{\sqrt{2\pi}\,\sigma} e^{-\frac{(x_i^j - \mu)^2}{2\sigma^2}} \qquad \text{Equation (1)}$$

where x is the distance between the sampling point $p_i$ and its corresponding candidate point $c_i^j$, represented as $x_i^j := \text{dist}(c_i^j, p_i)$. In one implementation, a zero-mean normal distribution with a standard deviation of about 66 feet (or about 20 meters) may be used. Alternatively, any normal distribution with a suitable standard deviation may be used.

It is assumed that a typical user 106 would desire the shortest and most direct route to a destination. Therefore, in one implementation, Equation (1) corresponds to a shortest path computation. A variety of shortest path algorithms may be used to compute the shortest path.

Figure 6:
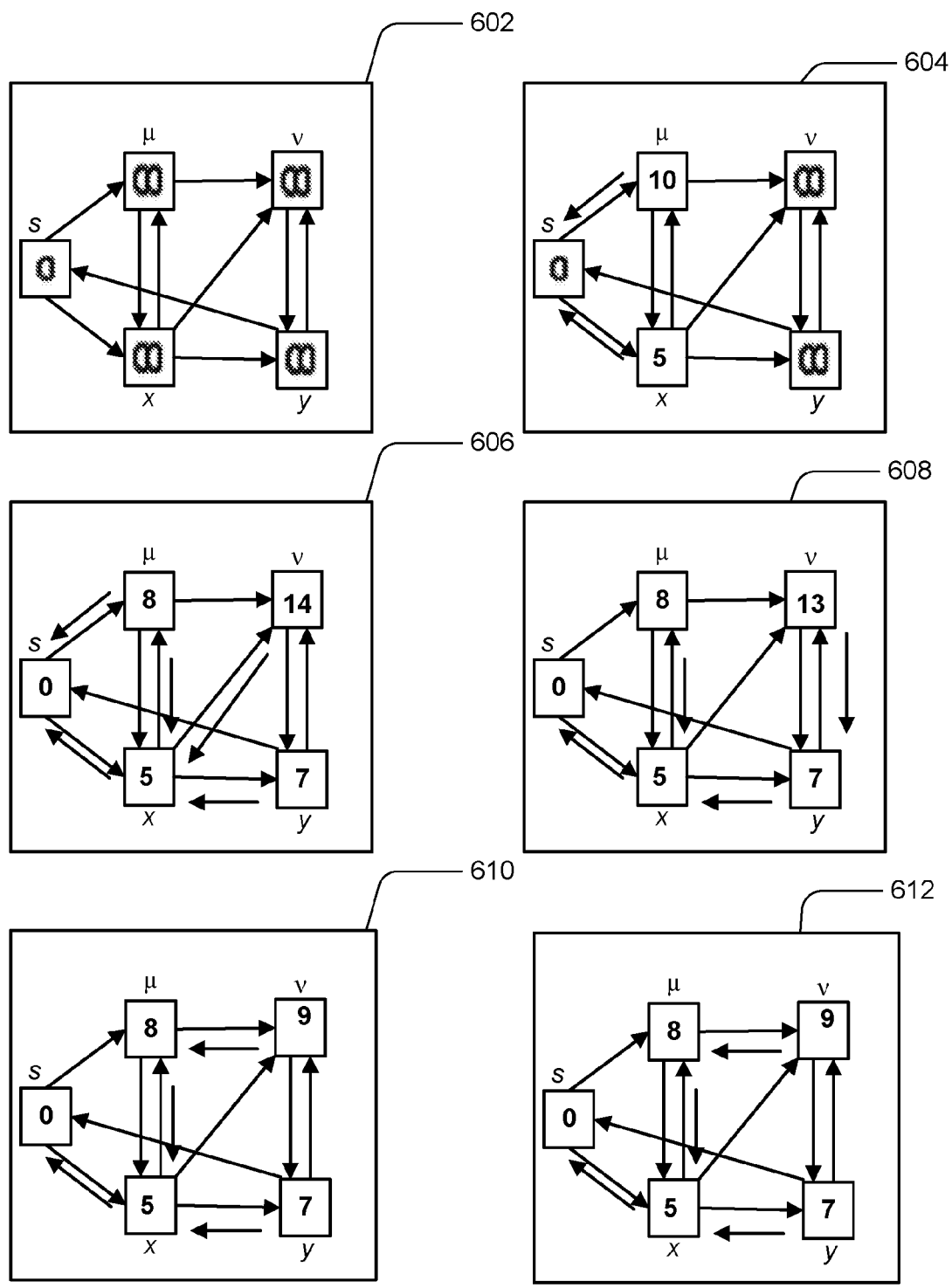
FIG. 6 is an illustrative shortest path computation.

FIG. 6 illustrates an exemplary shortest path computation utilizing a Dijkstra's shortest path algorithm. Steps 602, 604, 606, 608, 610, and 612, illustrate typical steps of a Dijkstra's computation. An example Dijkstra's algorithm is:

1. INITIALIZE SINGLE-SOURCE (G, s)
2. S ← { } // S will ultimately contains vertices of final shortest-path weights from s
3. Initialize priority queue Q i.e., Q ← V[G]
4. while priority queue Q is not empty do
5.    u ← EXTRACT_MIN(Q) // Pull out new vertex
6.    S ← S ∪ {u}
   // Perform relaxation for each vertex v adjacent to u
7.    for each vertex v in Adj[u] do
8.       Relax (u,v,w)

where G represents a candidate graph, s represents a source vertex or source sampling point, Q is a set of candidate projection points, and a vertex represents sampling points other than the source sampling point. A tree T is built that spans all reachable vertices from a point S. Vertices are added to the tree T in order of the distance between the source sampling point and the remaining sampling points. For example, a first distance S, then a vertex closest to S, and so on.

As described above, an exemplary spatial analysis 414 has an observation probability component and a transmission probability component. The example Dijkstra's algorithm described above results in an observation probability.

The transmission probability for candidate points $c_{i-1}^t$ to $c_i^s$ for two neighboring sampling points $p_{i-1}$ and $p_i$ respectively, is the likelihood that the "true" path from $p_{i-1}$ and $p_i$ follows the shortest path from $c_{i-1}^t$ to $c_i^s$. Such a true path is represented by:

$$V(c_{i-1}^t \to c_i^s) = \frac{d_{i-1 \to i}}{w_{(i-1,t) \to (i,s)}} \qquad \text{Equation (2)}$$

where $d_{i-1 \to i} = \text{dist}(p_i, p_{i-1})$ is the Euclidean distance between $p_i$ and $p_{i-1}$, and $w_{(i-1,t) \to (I,s)}$ is the length of the shortest path from $c_{i-1}^t$ to $c_i^s$.

The product of the observation probability and the transmission probability reflect the likelihood that the user 106 will move from $c_{i-1}^t$ to $c_i^s$. Combining the observation probability and the transmission probability, an exemplary spatial analysis function is:

$$F_s(c_{i-1}^t \to c_i^s) = N(c_i^s) * V(c_{i-1}^t \to c_i^s), \quad 2 \le i \le n \qquad \text{Equation (3)}$$

where $c_{i-1}^t$ and $c_i^s$ may be any two candidate points for two neighboring sampling points $p_{i-1}$ and $p_i$. The spatial analysis 414 for a candidate $p_i$ will differ depending upon the previous candidate point.

Figure 7:
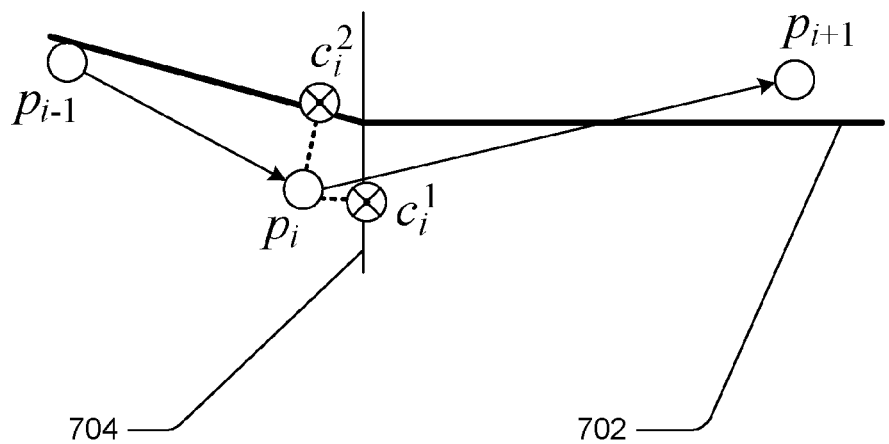
FIG. 7 is a further illustration of the spatial-temporal analysis of FIG. 4.

As previously discussed, map-matching based on spatial analysis alone, typically leads to poor accuracy when determining a best trajectory or route. For example, as illustrated in FIG. 7, a bold line 702 represents a highway, and a thin line 704 represents a service road. Just looking at sampling point $p_i$ it is difficult to determine from which road sampling point $p_i$ was most likely sampled. In this example, although $p_i$ appears closer to the service road 704, the neighboring point's $p_{i-1}$ and $p_{i+1}$ are closer to the highway, which may suggest that $p_i$ was more likely sampled from a location on the highway than a location on the service road. This example illustrates the potential for errors when performing map-matching based solely on spatial analysis.

Analyzing speed information in addition to the location information can increase the accuracy of the map-matching. In the example shown in FIG. 7, because the service road 704 and highway 702 are located in close proximity to one another, whether $p_i$ is on the highway or the service road, the candidate points $c_i^1$ and $c_i^2$ have similar spatial measurements. However, if the average speed of the user 106 is calculated over a time interval $\Delta t$, a speed indicting a highway or a service road may be determined, enabling a more accurate result when determining the best trajectory or route for the user. For example, if a typical service road has a speed limit of 30 miles per hour (mph), and over the time interval, an average speed of 65 (mph) is calculated, then it would be more reasonable to map sampling point $p_i$ to the candidate projection point $c_i^2$ on the highway.

Therefore, an exemplary temporal analysis 416 is based upon an average speed between two candidate points $c_{i-1}^1$ and $c_i^s$ corresponding to two neighboring sampling points, $p_{i-1}$ and $p_i$, respectively. The average speed $\bar{v}_{(i-1,t) \to (i,s)}$ is calculated using the formula:

$$\bar{v}_{(i-1,t) \to (i,s)} = \frac{\sum_{u=1}^{k} l_u}{\Delta t_{i-1 \to i}} \qquad \text{Equation (4)}$$

where $i_u = e'_u * 1$ is the length of road segment $e'_u$, and $\Delta t_{i-1 \to i} = p_i * t - p_{i-1} * t$ is the time interval between the two sampling points $p_i$ and $p_{i-1}$. In an exemplary implementation, each road segment $e'_u$ is also associated with a typical speed value $e'_u * \upsilon$, and a cosine distance may be used to measure the similarity between the actual average speed from $c_{i-1}^1$ to $c_i^s$ and the speed constraints (e.g., known speed limits) of the path. Alternatively, any suitable measurement may be used to determine the similarity. Considering a vector k with elements of the same value $\bar{v}_{(i-1,t) \to (i,s)}$ and the vector $(e'_1 v, e'_2 v, \ldots, e'_k v)^T$, an exemplary temporal analysis function is calculated as:

$$F_t(c_{i-1}^t \to c_i^s) = \frac{\sum_{u=1}^{k}(e'_u, v \times \bar{v}_{(i-1,t) \to (i,s)})}{\sqrt{\sum_{u=1}^{k}(e'_u, v)^2} \times \sqrt{\sum_{u=1}^{k}\bar{v}_{(i-1,t) \to (i,s)}^2}} \qquad \text{Equation (5)}$$

Combining Equation (3) and Equation (5), as set forth above, the spatial-temporal (ST) function $c_{i-1}^1 \to c_i^s$ is:

$$F(c_{i-1}^t \to c_i^s) = F_s(c_{i-1}^t \to c_i^s) * F_t(c_{i-1}^t \to c_i^s), \quad 2 \le i \le n \qquad \text{Equation (6)}$$

Referring back to the process illustrated in FIG. 4, a candidate graph 418 is created using candidate projection points determined during the spatial analysis 414 and the temporal analysis 416 calculations. The candidate graph 418 illustrates the possible trajectories or routes available to the user 106 and is used to perform a best path search 420.

Figure 8:
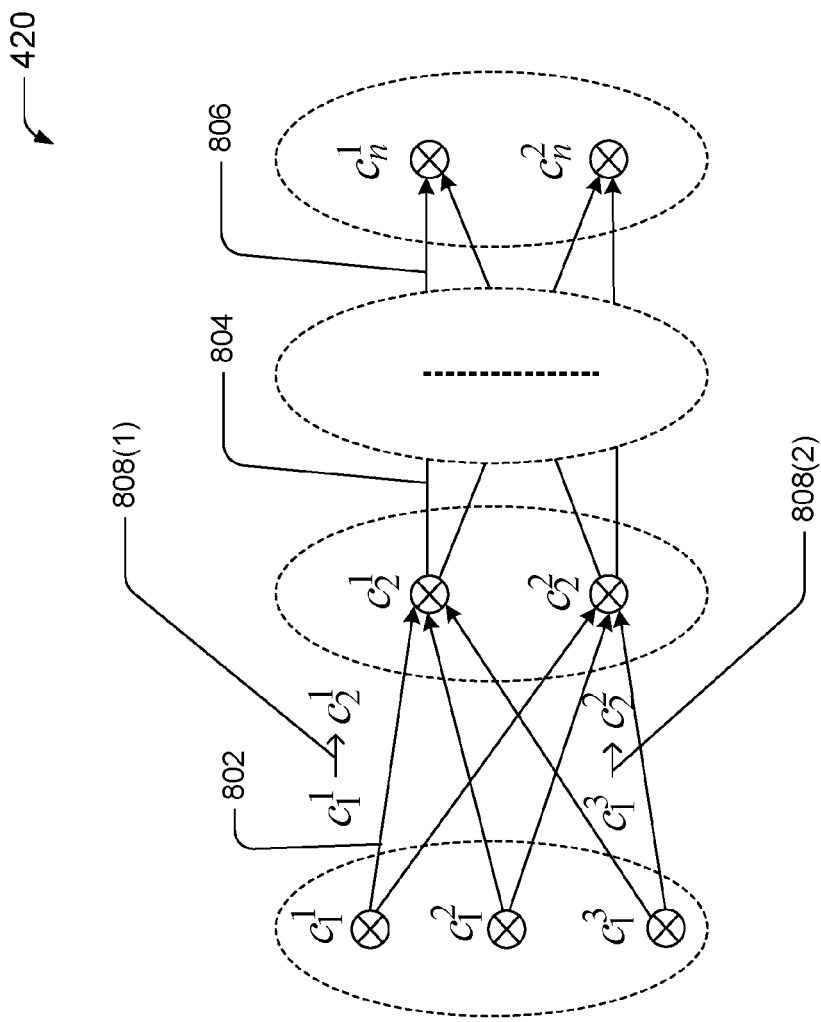
FIG. 8 is an illustrative candidate graph within the map-matching framework of FIG. 1.

FIG. 8 illustrates an exemplary best path search 420. For example, FIG. 8 illustrates an exemplary candidate graph $G'_T(V'_T, E'_T)$ for a trajectory T: $p_1 \rightarrow p_2 \rightarrow p_n$, where $V'_T$ is a set of candidate points corresponding to each of a set of received sampling points, and $E'_T$ is a set of edges representing the shortest paths between any two neighboring candidate points.

The candidate path search 420 may include $c_1^{s1} \rightarrow c_2^{s2} \rightarrow \ldots c_n^{sn}$, for example, 802→804→806.

To determine which candidate path sequence is a best match trajectory or route 422 corresponding to the sample points input by the user 106 or collected by the GPS 108, a score for each of the candidate path sequences is calculated. For example, scores for candidate path sequences 808(1) and 808(2) may be calculated and compared to determine which of the two candidate path sequences has the highest score, and is therefore the best match for the sampling points along the trajectory. In an exemplary implementation, the score for such a candidate sequence path is given by:

$$F(P_c) = \Sigma_{i=2}^n F(c_{i-1}^{si-1} \rightarrow c_i^{si}) \qquad \text{Equation (7)}$$

The best-match path P for a trajectory T may be selected using:

$$P = \arg \max_{P_c} F(P_c), \forall P_c \in G_T'(V_T', E_T') \qquad \text{Equation (8)}$$

Algorithm 1, set forth below, outlines an exemplary algorithm for a spatial and temporal analysis 404 using the map-matching module 114. Algorithm 1 includes the terms and equations described above in FIGS. 1-7 and Equations 1-6. According to Algorithm 1, a set of candidate points for each sampling point along a Trajectory T (for example, the sampling points found in the GPS logs 408) is calculated. A candidate graph is constructed based upon the spatial and temporal analyses, followed by a report identifying the path sequence P with the highest ST-function value from $G'_T$. The result is sent to Algorithm 2.

---
Algorithm 1 Map-Matching Algorithm
---
Input: Road Network G, a list of GPS points $p_1, p_2, \ldots, p_n$
Output: The matched sequence $c_{1,j1}, c_{2,j2}, \ldots, c_{n,jn}$
1:    Initialize tList as an empty list; // a list of sets of candidates
2:    for I = 1 to n do
3:       s = GetCandidates(pi, G, r); // candidates within radius r
4:       tList.add(s);
5:    G' = ConstructGraph(tList); // constructs graph G'
6:    RETURN FindMatchedSequence (G')

Algorithm 2, set forth below, outlines an exemplary algorithm for result matching, storage and visualization 406 based upon the results of Algorithm 1. Algorithm 2 determines the trajectory or route most likely to correspond to the received sampling points.

---
Algorithm 2 FindMatchedSequence
---
Input: Candidate graph G'
Output: The matched sequence $c_{1,j1}, c_{2,j2}, \ldots, c_{n,jn}$
1:    Let f[ ] denote the highest score found so far;
2:    Let pre[ ] denote the parent of current candidate;
3:    for each $c_{1,s}$ do
4:       $f[c_{1,s}] = F_s(c_{1,s})$;
5:    for i = 2 to n do
6:       for each $c_{1,s}$ do
7:          max = -∞;
8:          for each $c_{i-1,t}$ do ---
Algorithm 2 FindMatchedSequence (continued)
---
9:            alt = f $[c_{i-1,t}] + F_s(c_{1,s}) * F_t (Pc_{i-1,t}$ to $c_{1,s})$;
10:          if (alt>max) then
11:            max = alt;
12:            pre[$c_{1,s}$] = $c_{i-1,t}$;
13:          f[$c_{1,s}$] = max;
14:    Initialize rList as an empty list;
15:    p = maxarg$_{cn,s}$(f[$c_{n,s}$]);
16:    for I = n downto 1 do
17:       rList.add(p);
18:       p = pre[p];
19:    return rList.reverse90;

The exemplary ST-matching strategy represented by Algorithm 1 and Algorithm 2 is based upon a global algorithm, meaning the best path sequence is computed based upon an overall score for the entire trajectory of the candidate path sequence. However, if a trajectory has too many sampling points (i.e., n is very large) map-matching module 114 may use a local algorithm, based on a subset of the sampling points, to determine a matching result 422.

Figure 9:
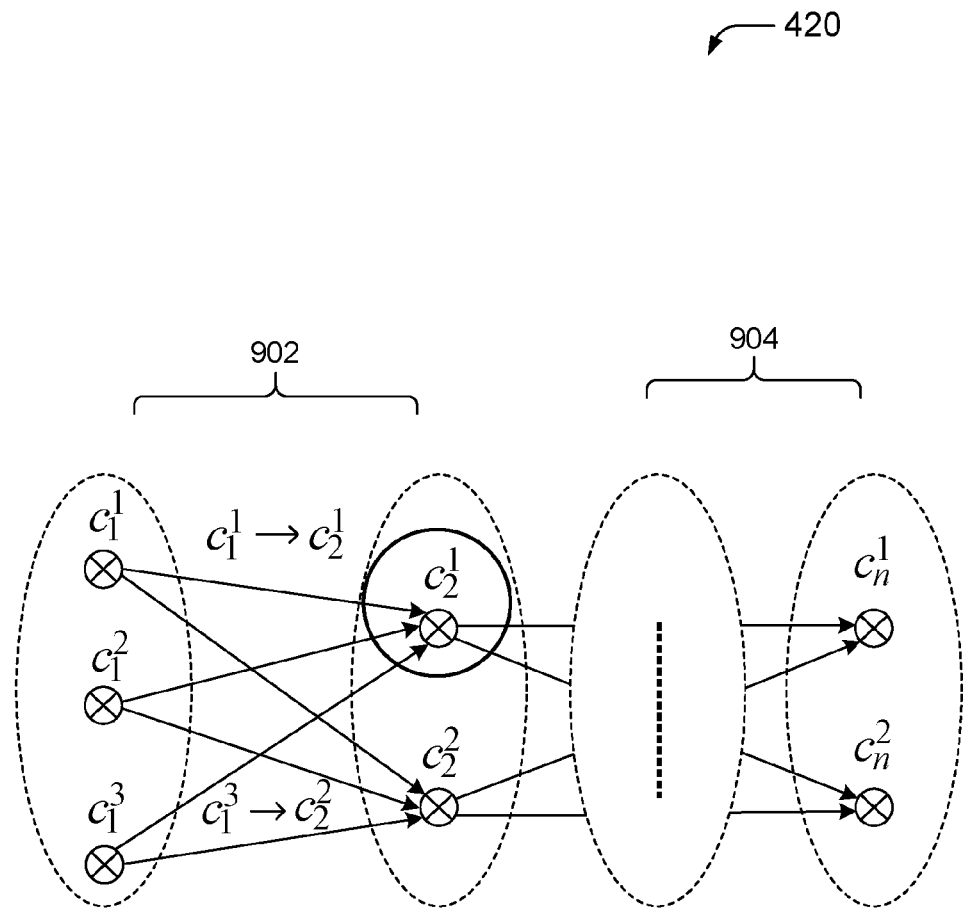
FIG. 9 is an illustrative local spatial-temporal matching strategy.

FIG. 9 illustrates an exemplary best path search 420 using a local algorithm. As illustrated in FIG. 9, each partial candidate graph 902 and 904 is constructed from a trajectory T A best matching sequence is determined for each partial candidate graph similar to the global algorithm approach set forth above. The process is repeated for each partial candidate graph to determine a matching result 422.

Figure 10:
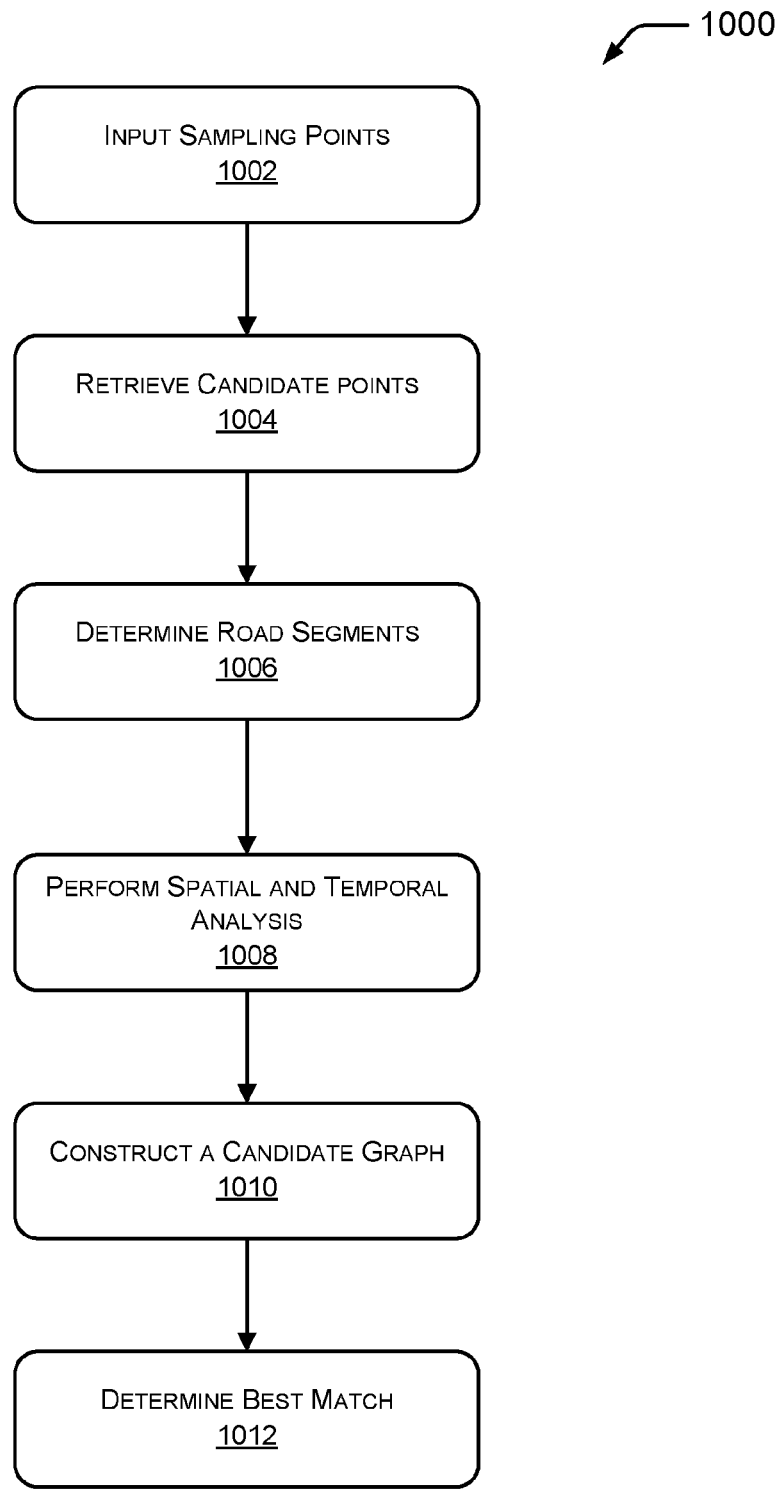
FIG. 10 is an illustrative process flow of the map-matching framework of FIG. 1.

FIG. 10 illustrates an exemplary method outlining the map-matching procedure set forth above. At block 1002, a set of sampling points are collected by GPS 108 on computing device 102. The sampling points are communicated from the computing device 102 to the map-matching module 114 over network 104. At block 1004 map-matching module 114 generates a set of candidate projection points corresponding to each sampling point. For example, a for every $p_1$, a set of candidate points may include $c_1^1$, $c_1^2$, and $c_i^3$. Using these candidate points, map-matching module 114 may access a road network database at block 1006 to determine one or more corresponding road segments. At block 1008, map-matching module 114 may perform a spatial analysis and a temporal analysis using the set of candidate points. For example, an observation measurement, a transmission measurement, and a temporal measurement are illustrated in Tables 1 and 2, respectively, shown in FIG. 11.

Figure 11:
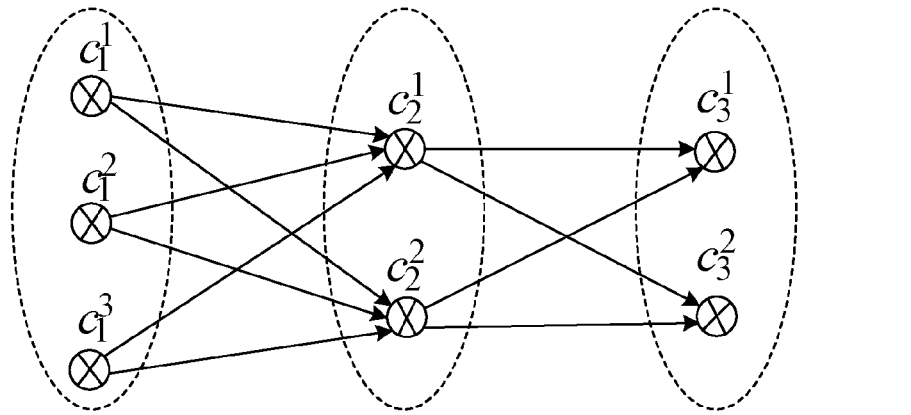
FIG. 11 is an illustrative example of the map-matching framework of FIG. 1.

At block 1010 a candidate graph may be constructed. For example, a candidate graph 1106, may be created corresponding to those measurements set forth in Tables 1 and 2, 1102 and 1104 of FIG. 11. At block 1012 map—matching module may determine a best match trajectory for the sampling points input by GPS 108. For example, map-matching module 114 may use Algorithms 1 and 2, described above, to ascertain which candidate point has the highest overall score, and therefore is the best match to the sampling points. For example, Table 3, 1108, illustrated in FIG. 11, shows $c_3^2$ having the highest overall score for candidate graph 1106. Therefore, $c_3^2$ may be chosen as the matching result for $p_3$, and therefore, the best match trajectory is most likely $c_1^1 \rightarrow c_2^2 \rightarrow c_3^2$.

CONCLUSION

Although map-matching for low-sampling rate GPS trajectories has been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method comprising:
   receiving location information corresponding to a first location;
   receiving location information corresponding to a second location;
   receiving GPS location data from a global positioning system (GPS) of a computing device, the GPS location data including a plurality of sampling points each corresponding to a location of the computing device at a different point in time;
   determining a first set of candidate projection points for a first sampling point of the plurality of sampling points corresponding to a first location of the computing device;
   determining a second set of candidate projection points for a second sampling point of the plurality of sampling points corresponding to a second location of the computing device;
   performing a spatial analysis on the first set of candidate projection points;
   performing a temporal analysis on the first set of candidate projection points, the temporal analysis based on an average speed between a pair of candidate projection points corresponding to two neighboring sampling points;
   constructing a candidate graph based upon results of the spatial analysis and the temporal analysis, the candidate graph including a plurality of paths between the candidate projection points of the first set and the candidate projection points of the second set;
   evaluating the plurality of paths of the candidate graph to determine a particular path between the first location and the second location; and
   causing the particular path between the first location and the second location to be presented at a graphical user interface.

2. The method of claim 1, wherein the average speed is determined between the first sampling point of the plurality of sampling points corresponding to the first location of the computing device and the second sampling point of the plurality of sampling points corresponding to the second location of the computing device.

3. The method of claim 1, wherein performing the spatial analysis comprises:
   determining an observation probability for at least candidate projection points for two neighboring sampling points;
   determining a transmission probability for the candidate points for the neighboring sampling points; and
   multiplying the observation probability by the transmission probability to produce a likelihood that the computing device will move from a candidate projection point associated with the first of the neighboring sampling points to a candidate projection point associated with the second of the neighboring sampling points.

4. The method of claim 3, wherein the observation probability is calculated according to a distance between the first sampling point and the candidate projection points in the first set.

5. The method of claim 3, wherein the transmission probability is calculated according to a plurality of candidate projection points and the corresponding plurality of sampling points, such that a distance between the plurality of sampling points follows the shortest path from a first candidate projection point to a second candidate projection point.

6. The method of claim 1, wherein the causing of the particular path between the first location and the second location to be presented at the graphical user interface comprises causing the particular path at the graphical user interface on a display associated with the computing device.

7. The method of claim 1, wherein the determining of the first set of candidate projection points and the determining of the second set of candidate projection points are performed by a built-in grid-based spatial index method.

8. The method of claim 1, wherein the evaluating of the plurality of paths of the candidate graph is based upon an overall score for a candidate sequence path calculated for each of the plurality of paths, wherein each overall score indicates a probability that a respective candidate sequence path is the particular path.

9. The method of claim 1, wherein the plurality of sampling points comprises data gathered by a GPS based upon a pre-determined, low-frequency sampling interval that samples the plurality of sampling points a minimum of every two minutes.

10. One or more computing devices, comprising:
    one or more processors;
    a memory coupled to the one or more processors; and
    one or more instructions stored in the memory and executed on the one or more processors to:
       receive location information corresponding to at least one user identified location;
       receive a plurality of sampling points collected from a global positioning system of a computing device along a computing device-travelled trajectory, each of the plurality of sampling points corresponding to a location of the computing device;
       determine a first set of candidate projection points for a first sampling point of the plurality of sampling points corresponding to a first location of the computing device;
       determine a second set of candidate projection points for a second sampling point of the plurality of sampling points corresponding to a second location of the computing device, wherein at least one of the first set of candidate projection points or the second sets of candidate projection points comprises two or more candidate projection points;
       determine a trajectory corresponding to the first sampling point, the second sampling point, and the location information corresponding to the at least one user identified location, wherein the trajectory is based upon a spatial-temporal analysis of the first sampling point and the second sampling point and an average speed between a pair of candidate projection points corresponding to two neighboring sampling points; and
       cause the trajectory corresponding to the first sampling point, the second sampling point, and the location information corresponding to the at least one user identified location to be displayed at a graphical user interface.

11. The one or more computing devices of claim 10, wherein the sampling points are collected at a pre-determined, low-frequency sampling interval that samples the plurality of sampling points at least every three minutes.

12. The one or more computing devices of claim 11, wherein the low-frequency sampling interval comprises, every 3 minutes, every 4 minutes, every 5 minutes, or a time period greater than every 5 minutes.

13. The one or more computing devices of claim 11, wherein the pre-determined sampling interval is defined by a user.

14. The one or more computing devices of claim 10, wherein a candidate path sequence is a result of the spatial-temporal analysis and is the best match trajectory corresponding to at least the first sampling point, the second sampling point, and the location information corresponding to the at least one user identified location.

15. The one or more computing devices of claim 10, wherein:
- a first neighboring sampling point is the first sampling point corresponding to the first location of the computing device;
- a second neighboring sampling point is the second sampling point corresponding to the second location of the computing device; and
- the memory stores further instructions for determining the average speed between the first sampling point.

16. The one or more computing devices of claim 10, wherein the spatial-temporal analysis employs a road network database comprising geometric information and topological information to evaluate the plurality of candidate projection points.

17. One or more computer-readable devices storing computer-executable instructions that, when executed on one or more processors, perform operations comprising:
- receiving, from a computing device, location information corresponding to at least one user identified location;
- receiving, from a global positioning system of the computing device, GPS location data comprising a plurality of sampling points each corresponding to a location of the computing device;
- performing a spatial-temporal analysis on a plurality of candidate projection points, the plurality of candidate projection points corresponding to the plurality of sampling points collected along a computing device-travelled trajectory,
- constructing a candidate graph having a plurality of candidate sequence paths based upon the plurality of candidate projection points and the location information corresponding to the at least one user identified location;
- evaluating the candidate graph to determine a trajectory based on the plurality of candidate sequence paths; and
- causing the trajectory to be displayed at a graphical user interface of the computing device, the trajectory including the location information corresponding to the at least one user identified location.

18. The one or more computer-readable devices of claim 17, wherein the plurality of sampling points are gathered during a pre-defined low-frequency sampling interval that samples the plurality of sampling points a minimum of every four minutes.

19. The one or more computer-readable devices of claim 17, wherein the candidate graph comprises one or more partial candidate graphs.

20. The one or more computer-readable devices of claim 17, wherein the spatial-temporal analysis is based upon an average speed determined between at least two consecutive sampling points of the plurality of sampling points corresponding to at least two consecutive locations of the computing device, and a speed constraint value of a road segment associated with one of the candidate projection points of the first pair of the candidate projection points.

* * * * *